United States Patent Office 3,472,058
Patented Oct. 14, 1969

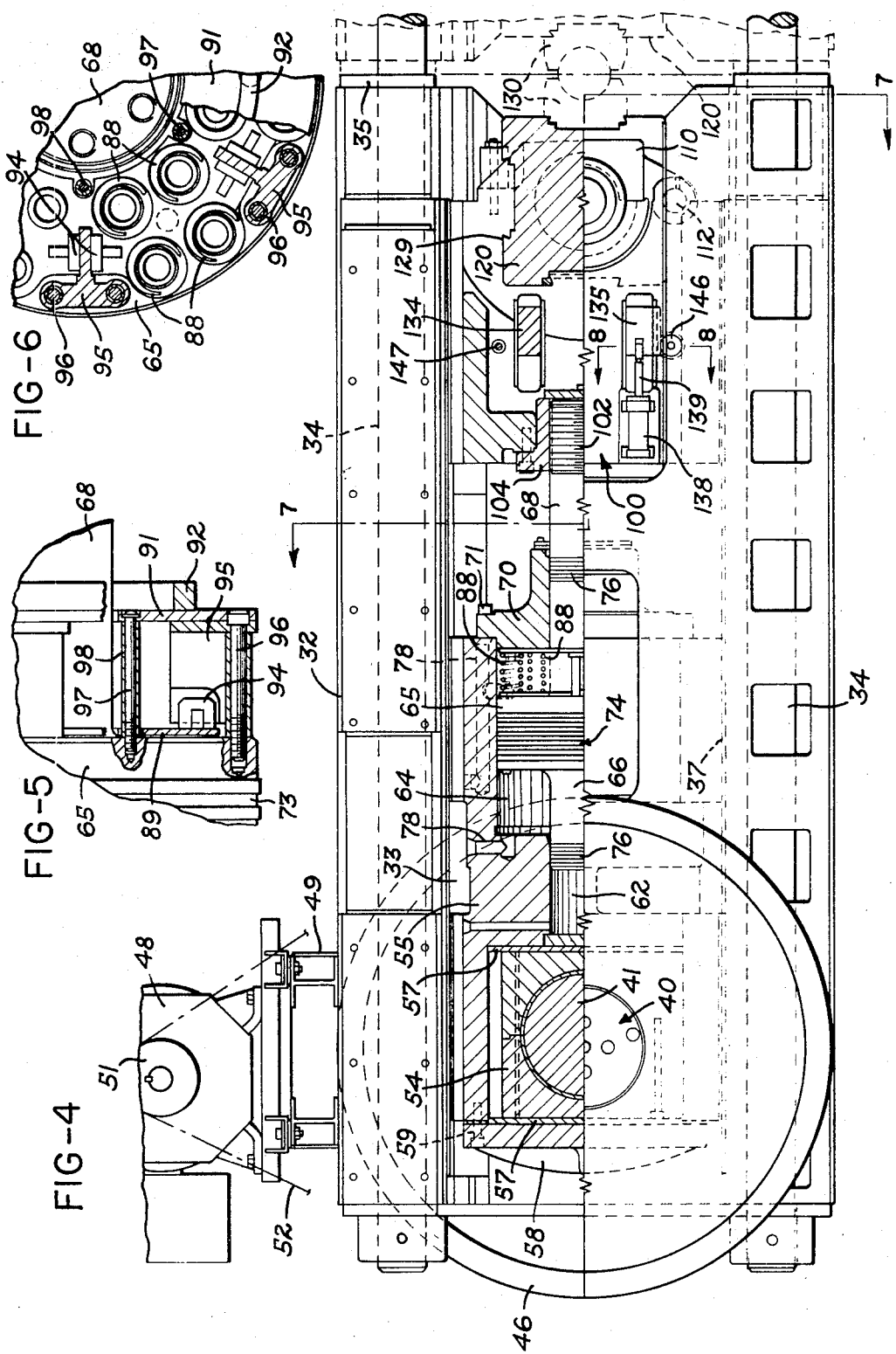

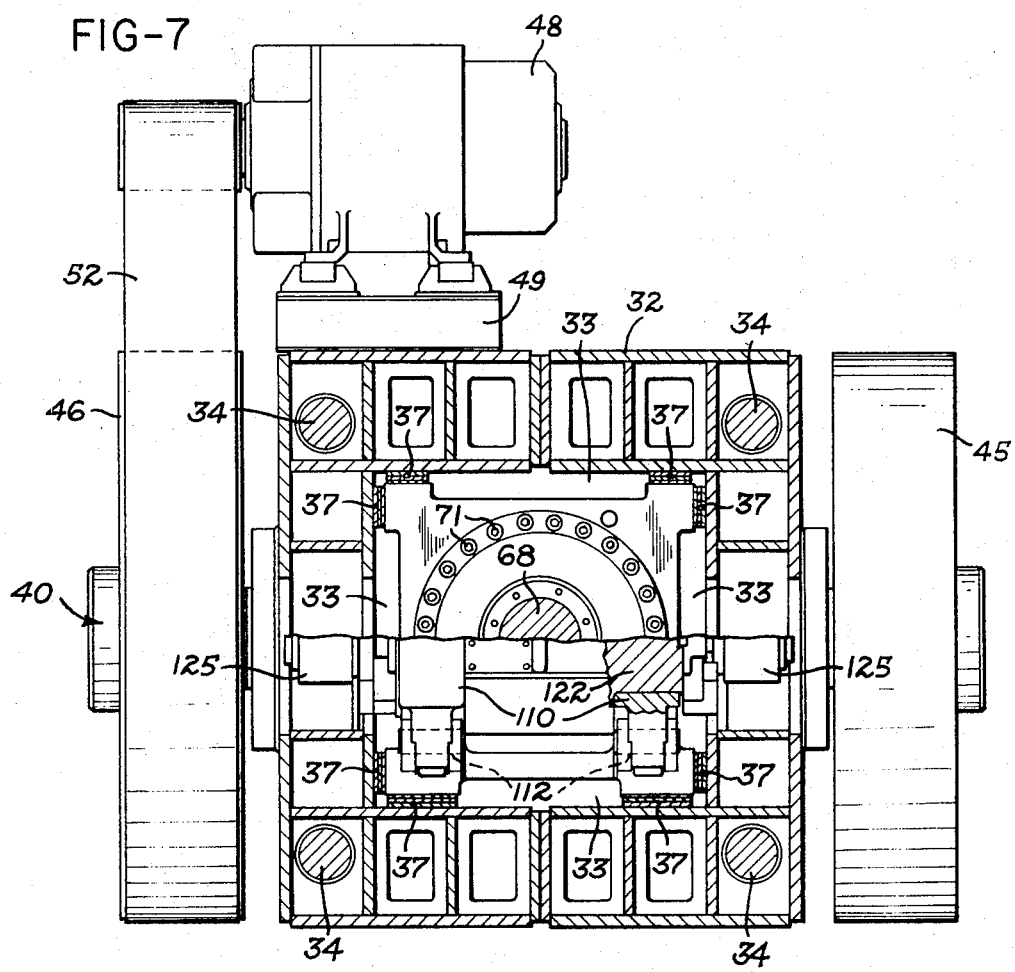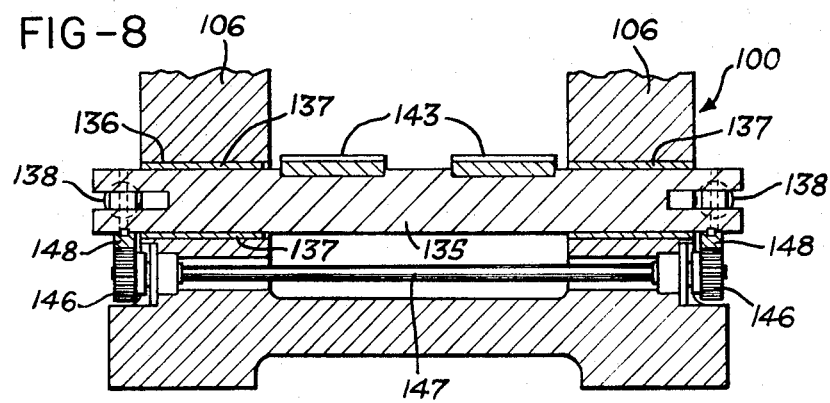

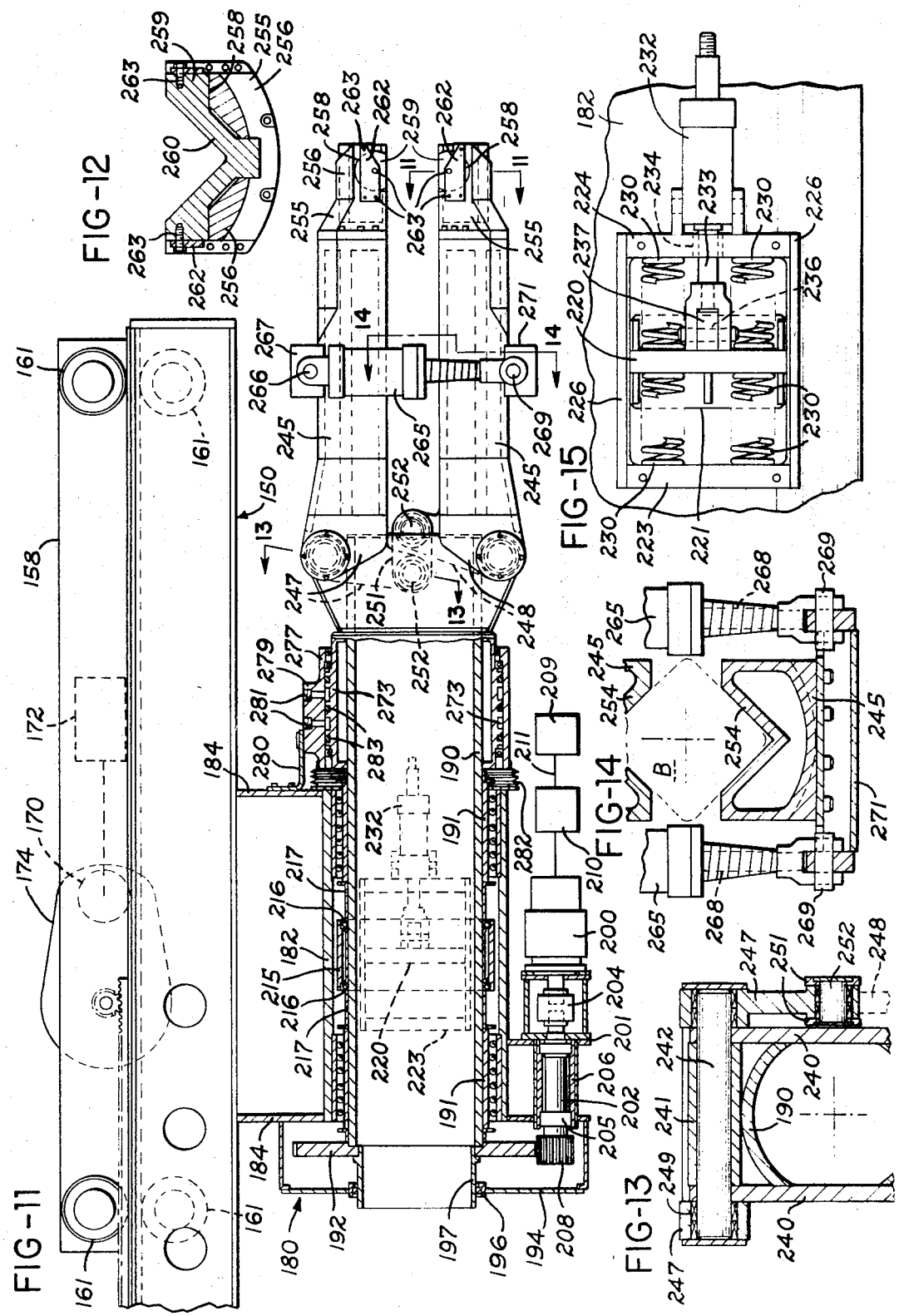

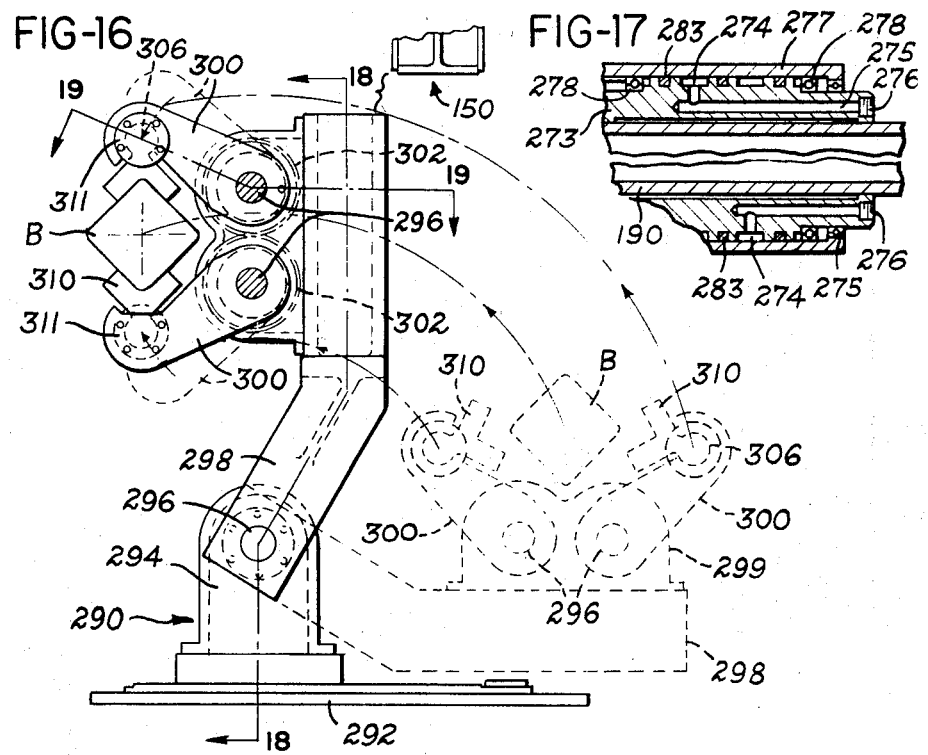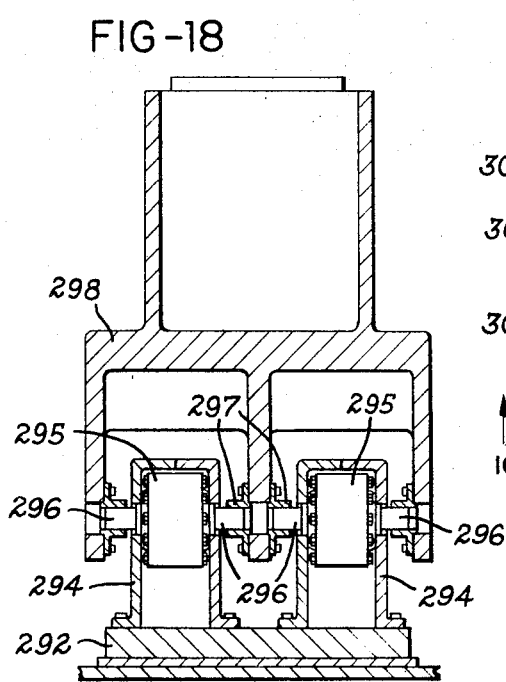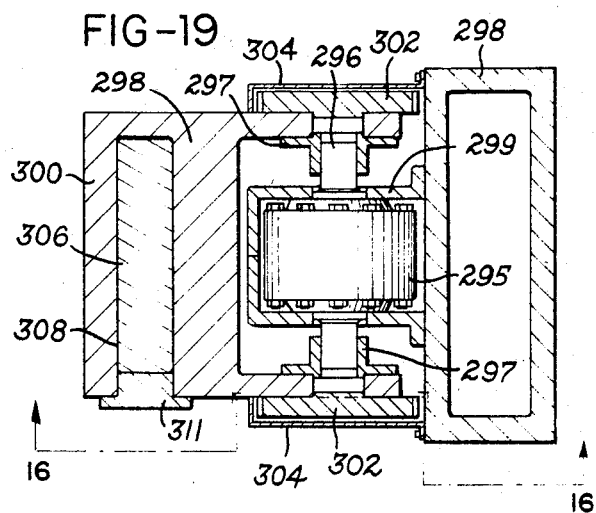

3,472,058
FORGING APPARATUS
Charles F. Hautau, Oxford, Ohio, assignor to The Black Clawson Company, Hamilton, Ohio, a corporation of Ohio
Filed Dec. 30, 1966, Ser. No. 606,188
Int. Cl. B21j 5/02, 13/02
U.S. Cl. 72—407                                  24 Claims

ABSTRACT OF THE DISCLOSURE

A billet is forged by apparatus incorporating a pair of opposing reciprocating rams each connected by an adjustably controlled hydraulic cylinder to a corresponding head member carrying a plurality of selectable die members. The billet is supported between the head members by one or more peels each including a tubular rotor and movable on tracks extending normally to the axis of the rams.

This invention relates to forging machinery, and more particularly to apparatus for rapidly and precisely forging a billet to a predetermined configuration to minimize subsequent machining and finishing operations and to provide for efficiently producing forged articles.

The forging apparatus of the invention provides a highly efficient method for producing axles for railroad cars by rapidly forging steel billets of uniform cross-section into the precise configuration of the axles. As a result of the precise forging, it has been determined that finished axles can be produced with a minimum removal of metal during subsequent machining, thereby significantly reducing the time and labor in finishing the axles, and in addition minimizing the production of scrap metal. It is to be understood, however, that forging apparatus constructed in accordance with the invention may be used for producing other forged articles, as for example, steel mill rolls, shafts, flat plates and the like.

To accomplish the precise and rapid forging of railroad car axles or other articles, apparatus constructed in accordance with the invention preferably includes a forging press supporting a pair of rams arranged in opposed aligned relationship. The rams are driven to reciprocate selectable sets of corresponding die members simultaneously towards and away from each other. A pair of tubular manipulators or peels are arranged in opposed aligned relationship on opposite sides of the press and are adapted to grip a billet both cooperatively and alternately for transporting the billet from a receiving station, back and forth through the press, and then to a discharge station. A billet transfer device is located at the receiving station to position the billet for gripping by the adjacent peel, and another transfer device is located at the discharge station to remove a forged billet or axle from the other peel and transfer the axle to a suitable conveyor.

Accordingly, it is a primary object of the present invention to provide a novel and efficient forging apparatus for quickly forming a billet into a precise predetermined configuration.

A more specific object of the invention is to provide forging apparatus including a press having a pair of opposed aligned rams supported for simultaneous reciprocating motion on a common axis to and from each other, and with each ram connected to move a plurality of corresponding die members adapted to be selectively positioned on opposite sides of a billet for progressively forming the billet into a precise configuration.

Another object of the invention is to provide apparatus including a head member connected to each ram through fluid cylinder means for adjustably positioning each head member relative to its corresponding ram so that the minimum spacing between a set of corresponding die members mounted on the head members can be adjusted to form various surface contours on the billet.

A further object of the invention is to prvide apparatus as outlined above and including a pair of tubular peels arranged in opposed aligned relationship and supported for independent movement in a direction perpendicular to the axis of reciprocation of the rams for transferring an elongated billet back and forth between the die members to form the entire billet to a predetermined configuration.

Still another object of the invention is to provide apparatus as outlined above and including a tubular peel supported by a carriage and having drive means for providing a billet supported by the peel with coordinated linear and rotary movement, and further including means for absorbing the output energy of the drive means to prevent overstressing of the peel and damage to the billet when the linear and rotary movement of the billet is momentarily stopped during impact by the die members.

It is also an object of the invention to provide a peel including a tubular rotor having low mass and a low moment of inertia so that rotation and linear movement of the rotor can be quickly stopped during the impact of the billet by a set of die members and quickly started after the die members release the billet; and Still another object of the invention is to provide forging apparatus as outlined above and which is perpendicularly adapted to be operated by programmed electrical control means so that a continuous supply of billets can be successively and automatically forged into articles having a predetermined configuration.

Other objects and advantages of the invention will be apparent from the following description, the accompanying drawings and the appended claims.

In the drawings:

FIG. 4 is an elevational view of the press section shown in FIG. 3 and with the upper half portion in section on the line 4—4 of FIG. 3;

FIG. 5 is an enlarged fragmentary view in part section of the piston mounted within the ram shown in FIG. 4;

FIG. 6 is a fragmentary view looking axially at the piston shown in FIG. 5 and with a portion broken away;

FIG. 7 is a section through the press taken generally along the line 7—7 of FIG. 4;

FIG. 8 is a section through the press taken generally along the line 8—8 of FIG. 4;

FIG. 11 is an elevational view of a peel with a portion shown in axial cross-section;

FIG. 12 is a section of the peel taken generally along the line 12—12 of FIG. 11;

FIG. 13 is a section of the peel taken generally along the line 13—13 of FIG. 11;

FIG. 14 is a section of the peel taken generally along the line 14—14 of FIG. 11;

FIG. 15 is a section of the peel taken generally along the line 15—15 of FIG. 10;

FIG. 16 is an elevational view of a transfer device for loading and unloading billets to and from the peels looking generally along the line 16—16 of FIG. 15;

FIG. 17 is a fragmentary section of the peel taken generally along the line 17—17 of FIG. 10;

FIG. 18 is a section of the transfer device taken generally along the line 18—18 of FIG. 16;

FIG. 19 is a section of the transfer device taken generally along the line 19—19 of FIG. 16.

Figure 1:
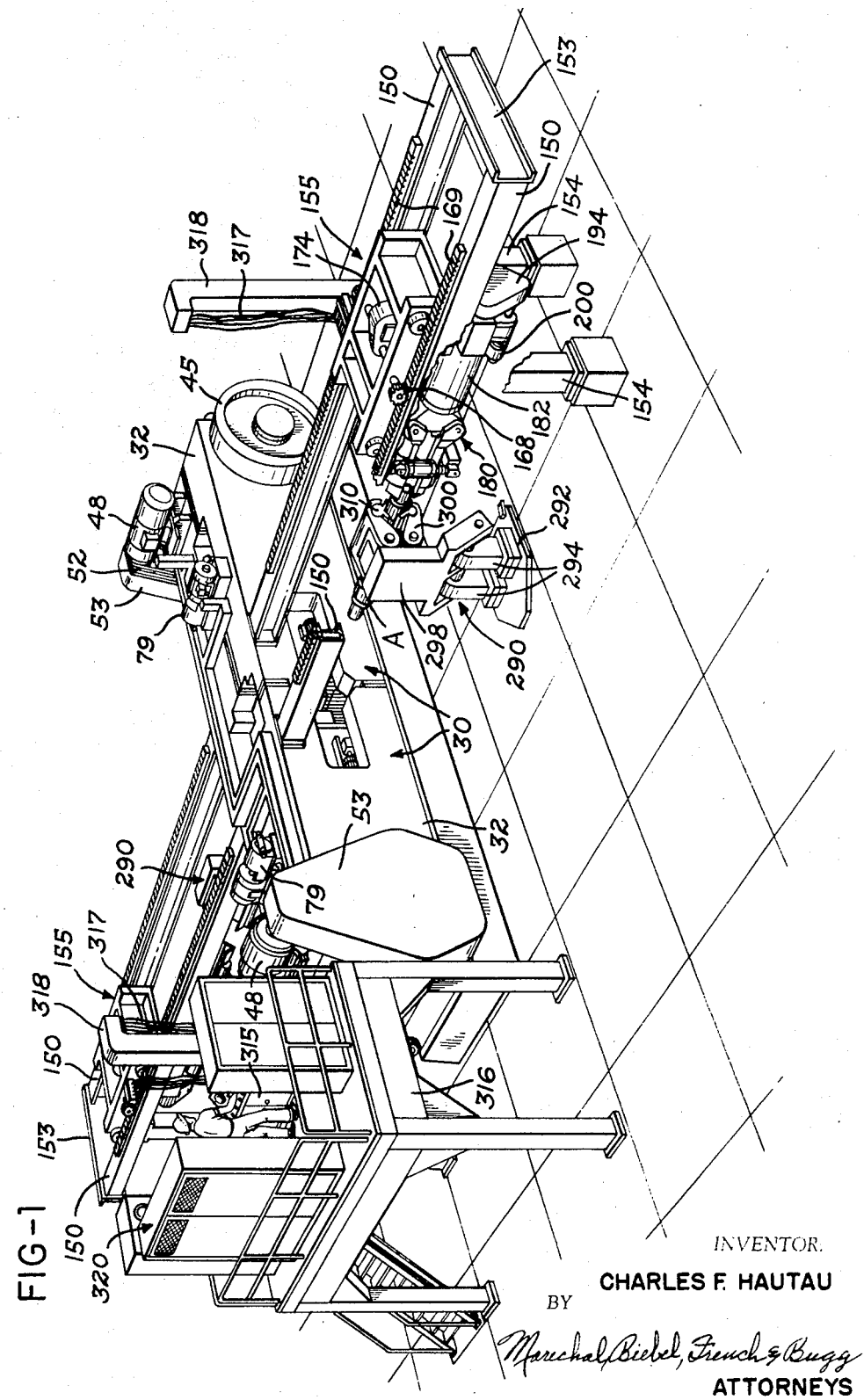
FIG. 1 is a perspective view of forging apparatus constructed in accordance with the invention.
Figure 2:
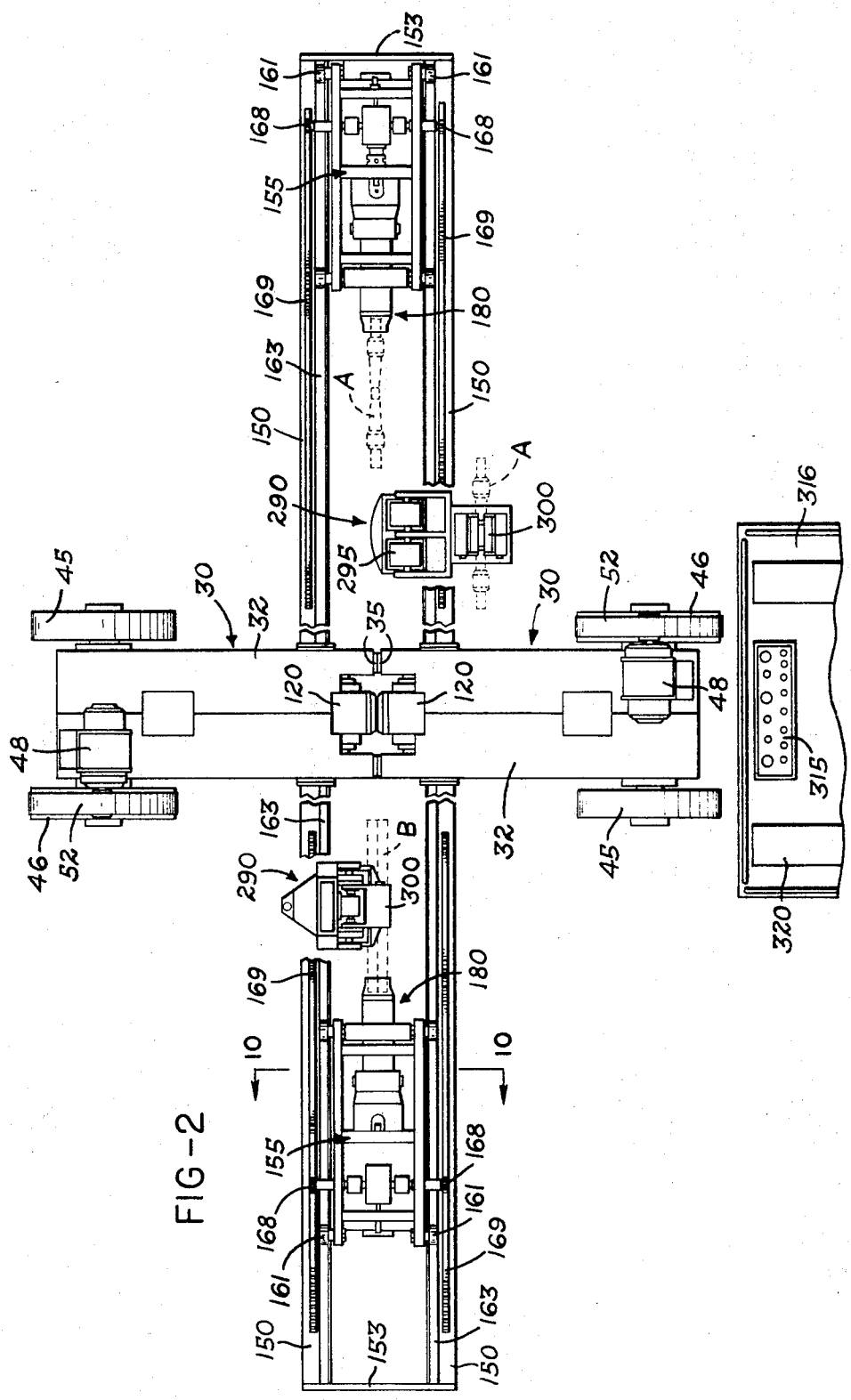
FIG. 2 is a plan view of the forging apparatus shown in FIG. 1 and with a portion broken away to show the transfer devices for loading and unloading billets.

Referring to the drawings, which illustrate a preferred embodiment of the invention, apparatus constructed in accordance with the invention includes a forging press comprising a pair of press sections 30 arranged in opposed aligned relationship as shown in FIGS. 1 and 2. Since both press sections 30 are substantially identical in construction, only one section will be described in detail.

Referring to FIGS. 3–9, each press section 30 includes an elongated tubular frame or housing 32 which is fabricated from steel plate to form an elongated chamber 33 of generally square configuration. Strained bolts 34 (FIGS. 4 and 7) extend longitudinally through the four corners of the housings 32 for both press sections 30 and rigidly connect the press sections with the corresponding forward faces 35 (FIGS. 2 and 3) abutting each other. Extending longitudinally within the chamber 33 and mounted on the housing 32 at each of the corners of the chamber are a series of wear plates 37 (FIG. 7).

A crank shaft 40 (FIG. 3) extends laterally through the rear portion of the housing 32 and includes an eccentric center portion 41 and journal portions 42 which are rotatably supported in corresponding bearings 43 mounted within corresponding cylindrical bushings 44 forming part of the housing 32. A flywheel 45 is mounted on one end portion of the crank shaft 40, and a flywheel pulley 46 is mounted on the opposite end portion of the crank shaft. An electric motor 48 (FIGS. 4 and 7) is mounted on a support frame 49 secured to the top surface of the housing 32 and includes a shaft supporting a drive pulley 51 which is connected to the flywheel pulley 46 by an endless multi-V belt 52. A protective cover 53 (FIG. 1) shields the pulley 46 and belt 52. The crank shafts 40 on both press sections are maintained in synchronism by controlling the drive motors 48 with an electrical servo control system (not shown).

A split bearing block 54 (FIGS. 3 and 4) is mounted on the eccentric portion 41 of the crank shaft 40 and is slidably supported for vertical movement within the rear portion of a ram housing 55 which, in turn, is slidably supported within the chamber 33 of the housing 32 by corner wear plates 37 secured to the ram housing and engaging the corresponding wear plates on the housing 32. The bearing block 54 is retained within the rear portion of the ram housing 55 between wear plates 57 (FIG. 4) by an end cap or cover plate 58 secured to the ram housing by screws 59 (FIG. 4). the general arrangement of the bearing block 54 mounted on the eccentric portion 41 of the shaft 40 and on the bearing block vertically slidable in a horizontally slidable ram housing is commonly referred to as a scotch yoke.

A cylindrical bore 62 is formed within the central portion of the ram housing 55 and extends into a cylinder chamber 64 formed within the forward portion of the ram housing. A piston 65 is slidably supported within the cylinder chamber 64 and includes an integral rearwardly extending piston rod 66 which is slidably received within the bore 62. A forwardly extending piston rod 68 is also formed as an integral part of the piston 65 and is slidably supported within a bore 69 formed within a cap member 70 mounted on the forward end portion of the ram housing 55 and secured thereto by screws 71.

The piston rods 66 and 68 have the same diameter and cooperate with the piston 65 to divide the cylinder chamber 64 into annular chambers of equal cross-sectional size on opposite sides of the piston 65. Circumferential grooves 73 (FIG. 3) are formed within the piston 65, and similar grooves are formed within piston rods 66 and 68 for receiving corresponding ring seals 74 and 76 (FIG. 4) to prevent escape of hydraulic fluid supplied to the cylinder chamber 64 on both sides of the piston 55 through the passageways 78 connected by conduits to a motor driven supply pump 79 (FIG. 1) through a solenoid controlled valve (not shown).

Figure 3:
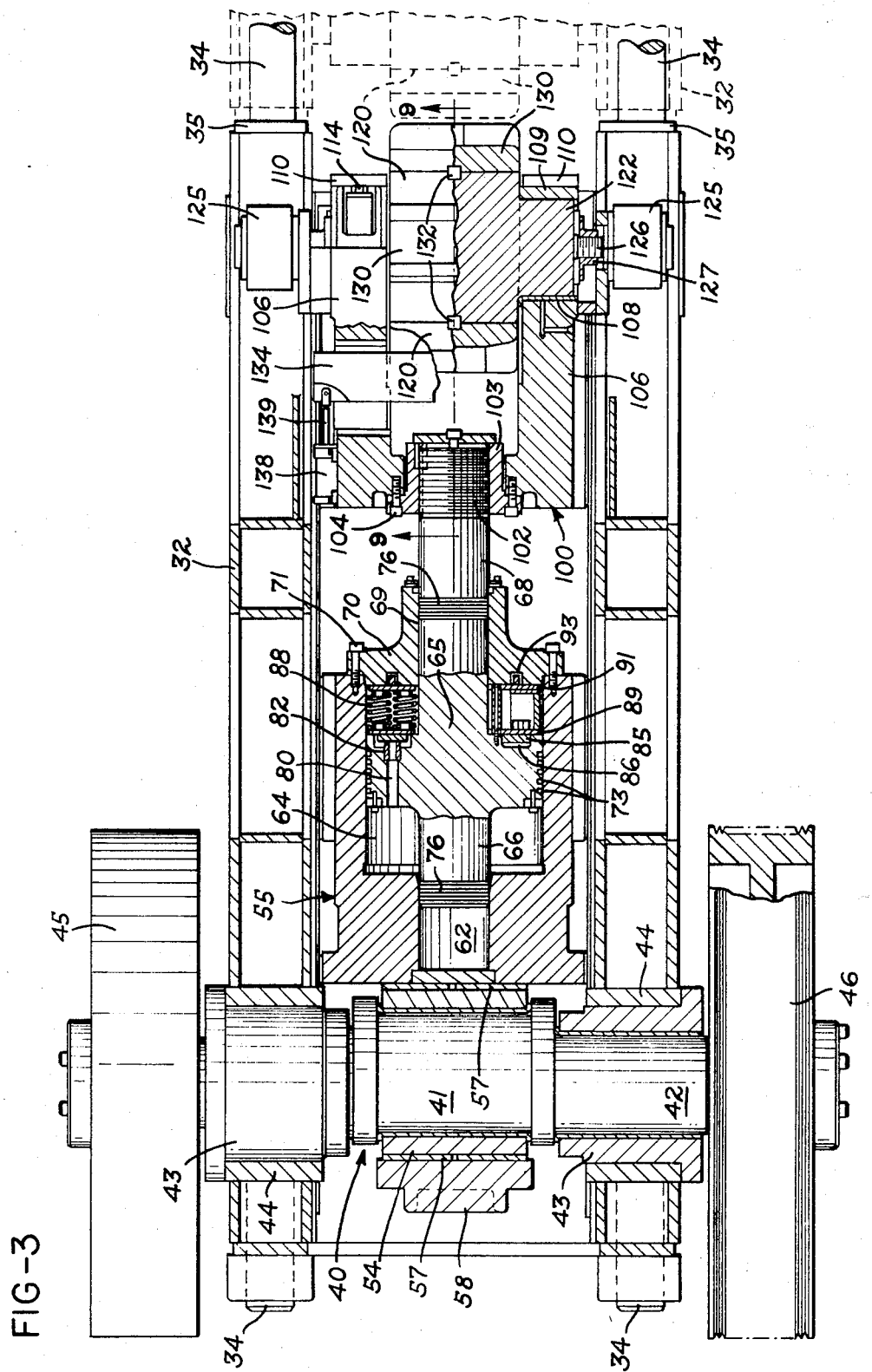
FIG. 3 is a plan view of one section of the forging press shown in FIG. 1 and with a substantial portion broken away on the line 3—3 of FIG. 4 to show internal construction.

As shown in FIG. 2, a series of annularly arranged passageways 80 extend axially through the piston 65, and a tubular nozzle member 82 is mounted within the piston at the forward end of each passageway. An annular flat closure member 85 (FIG. 3) is located within a corresponding annular groove 86 formed within the forward face of the piston 65 and is biased against the forward end of the nozzles 82 by a series of annularly arranged compression springs 88 spaced between a set of annular plates 89 and 91 (FIGS. 3 and 5). A reinforcing ring 92 (FIG. 5) is rigidly secured to the plate 91 and is adapted to be received within an annular groove 93 formed within the rear face of the cap member 70 when the piston is in its foremost position.

The plate 89 serves as a backing plate for the closure member 85 and is adapted to move axially with the piston 65 but is prevented from rotating by a series of tabs 94 (FIGS. 5 and 6) located on opposite sides of corresponding spacer members 95 secured to the piston by screws 96. The plate 91 is screwed to the piston 65 by screws 97 extending through tubular spacers 98.

A forward ram housing 100 (FIGS. 3 and 4) is also slidably supported within the chamber 33 by corner wear plates 37 and is connected to the threaded end portion 102 of the forwardly extending piston rod 68 by a ram nut 103 (FIG. 9) secured by screws 104 within a central bore formed within the forward ram housing 100. Referring to FIG. 3, the forward ram housing 100 includes parallel spaced side walls 106 in which are formed semi-cylindrical bearing surfaces 108. Corresponding mating surfaces 109 are formed within a pair of shoes 110 (FIG. 4) having lower portions pivotally connected to the corresponding side walls 106 by pins 112. The upper portions of the shoes 110 are removably secured to the forward face of the walls 106 by screws 114.

A generally square turret head 120 (FIGS. 3, 4 and 9) is positioned between the side walls 106 of the forward ram housing and includes journal portions 122 rotatably supported within the mating semi-cylindrical bearing surfaces 108 and 109. A hydraulic motor 125 (FIG. 3) is mounted on the outer surface of each side wall 106 of the ram housing 100 and includes an output shaft 126 which is connected by a flange 127 to the corresponding journal portion 122 of the turret head 120.

A dove-tail slot 128 (FIG. 9) is formed within each face 129 of the turret head 120 and a die member 130 is retained within each slot by an axially extending key 131 and a laterally extending key 132 (FIG. 3). Corresponding die members 130 on each of the press sections 30 are provided with corresponding mating die cavities 133 to form a die set, and each die set is formed having cavities of different configuration. The hydraulic motors 125 are controlled by solenoid valves (not shown) for indexing the turret head 120 back and forth through an angle of 270° to present each of the four die members 130 in opposed relationship with the corresponding die member on the opposing press section. Removal of the turret head 120 can be performed simply by removing the screws 114 and lowering the shoes 110.

A laterally extending upper lock bar 134 (FIG. 9) and a parallel spaced lower lock bar 135 are each slidably supported within corresponding aligned slots 136 formed within the side walls 106 of the forward ram housing 100. The slots 136 are lined with wear plates 137 (FIG. 6), and the lock bars 134 and 135 are moved within the slots by corresponding hydraulic cylinders 138 (FIGS. 3 and 4) mounted on the forward ram housing 100 and having piston rods 139 connected to corresponding ends of the lock bars.

Figure 9:
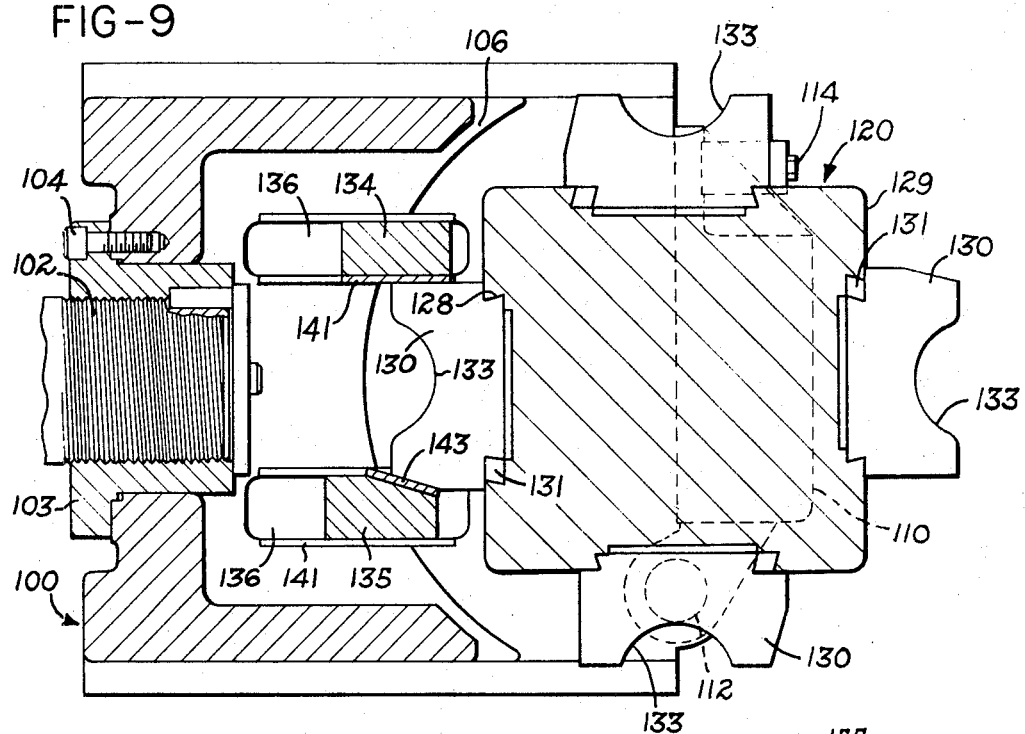
FIG. 9 is a section of the press taken generally along the line 9—9 of FIG. 3.

As shown in FIG. 9, the upper lock bar 134 is provided with a wear plate 141 having a horizontally flat bottom surface which is adapted to provide a seat for a corresponding flat suface formed on each of the die members 130. The lower lock bar 135 is provided with a pair of sloping wear plates 143 (FIG. 8) forming a tapered surface which is adapted to engage a corresponding tapered surface formed on the opposite side of each die member 130.

Referring to FIGS. 4 and 8, each of the lock bars 134 and 135 is prevented from cocking during movement from a retracted position to an extended position within the forward ram housing 100 by a pair of spur gears 146 which are secured to opposite ends of a laterally extending shaft 147. The gears 146 engage corresponding racks 148 mounted on the bottom surface of the lower lock bar 135 and the upper surface of the upper lock bar 134. Thus when the lock bars are retracted by the hydraulic cylinders 138 controlled by solenoid valves, the turret head can be rotated or indexed by actuation of the fluid motors 125 connected to opposite ends of the turret head.

Referring to FIGS. 1 and 2, a pair of parallel spaced rails 150 extend horizontally from each side of the assembled press sections 30 and are each formed by an H-beam 151 (FIG. 10) having a longitudinally extending vertical side plate 152 secured to its outer edges. Each pair of rails 150 extend from the upper portions of the press sections 30 perpendicularly to the longitudinal centerline of the press, that is, at right angles to the common axis of the corresponding ram housings 55 and 100. The outer ends of the rails 150 are connected by a cross member 153, and suitable vertical posts 154 (FIG. 1) support the rails from the floor.

Figure 10:
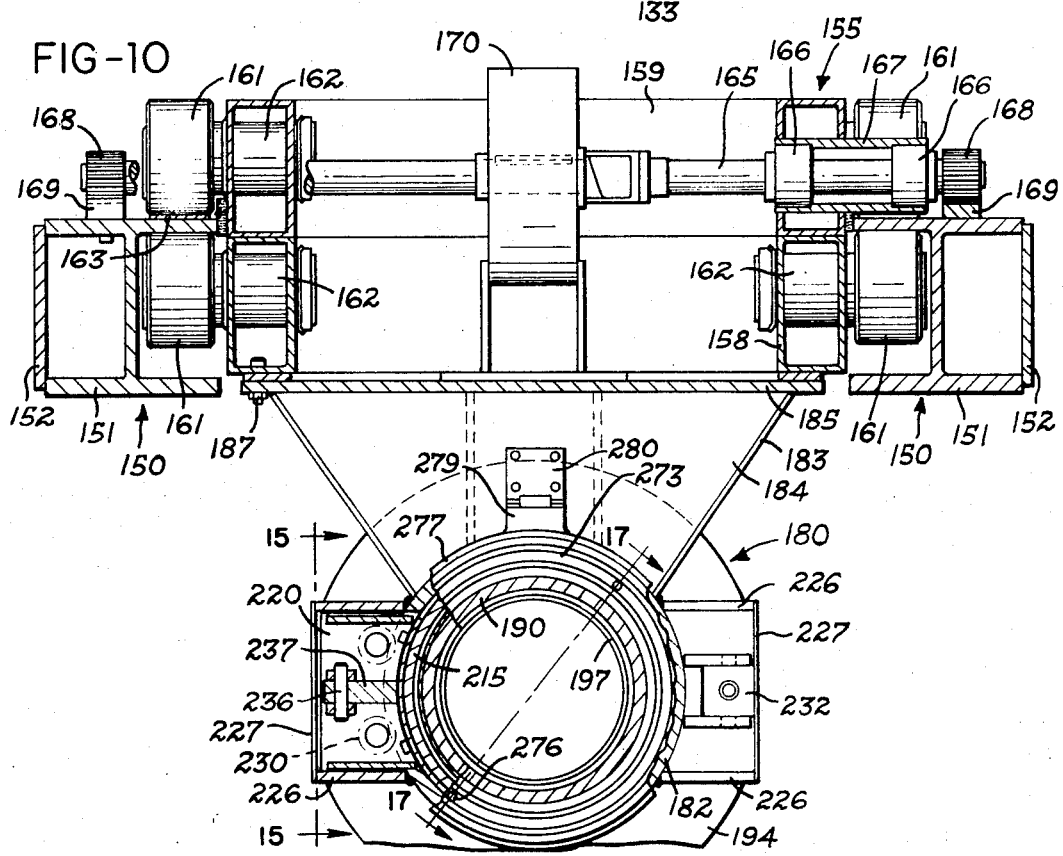
FIG. 10 is a section of a peel and its supporting carriage taken generally along the line 10—10 of FIG. 2 and with a portion of the peel broken away.

A carriage 155 (FIGS. 1, 2, 10 and 11) is supported by each pair of rails 150 and includes a frame formed by a pair of longitudinal tubular members 158 rigidly connected by lateral tubular members 159. As shown in FIG. 10, a pair of vertically arranged wheels 161 are supported by tubular shafts 162 extending through the longitudinal members 158 at each corner of the carriage 155. The wheels are spaced on opposite sides of the corresponding upper flange of the H-beams 151 with the upper wheels 161 resting on longitudinally extending wear plates 163 secured to the upper surfaces of the beams.

A drive shaft 165 (FIG. 10) extends laterally through the longitudinal members 158 of each carriage 155 and is rotatably supported by bearings 166 retained within tubular housings 167 rigidly secured to the frame members 158. A pinion 168 is mounted on each end of the drive shaft 165 and meshes with a rack 169 mounted on the top surface of the corresponding rail 150 and extending substantially the full length of the rail as shown in FIGS. 1 and 2. The drive shaft 165 is driven by a variable speed reversible hydraulic motor 170 (FIG. 11) which is supplied with fluid from a motor driven variable volume hydraulic pump 172. The motor 170 and pump 172 are enclosed within a housing 174 supported by the carriage. Preferably, the hydraulic motor 172 is of the adjustable volume type, and an electrically controlled linear actuator is connected to change the output volume of the pump and motor to control the speed of movement of the carriage 155 in either direction or to stop the carriage.

A manipulator or peel 180 (FIGS. 10 and 11) including a cylindrical housing 182 is suspended from each carriage 155 by a fabricated frame including a pair of sloping side plates 183 (FIG. 10) and vertical end plates 184. The plates 183 and 184 are rigidly connected to a top horizontal plate 185 secured by bolts 187 to the bottom surfaces of the longitudinal frame member 158 of the carriage 155.

An elongated rotor 190 (FIG. 11) is supported within the cylindrical housing 182 of each peel 180 by a pair of spaced apart sleeve-type anti-friction bearings 191 which enable the rotor to move axially in addition to rotating. An annular gear 192 is mounted on the rear end portion of the rotor 190 and is enclosed by a casing 194. An annular seal 196 is mounted on the casing 194 and slidably contacts a cylindrical gland member 197 mounted on the gear 193.

A hydraulic motor 200 (FIG. 11) is supported by a frame 201 secured to the lower portion of the housing 182 of each peel and is connected to a stub drive shaft 202 through a coupling 204. The drive shaft 202 is rotatably supported by bearings 205 retained within a tubular housing 206, and a drive pinion 208 is mounted on the end portion of the drive shaft for engaging the annular gear 192 mounted on the rotor 190. The hydraulic motor 200 is supplied with fluid from an electric motor driven pump 209, and an accumulator 210 is located within the fluid supply line 211 for momentarily absorbing the output energy of the pump.

Referring to FIG. 11, a cylindrical sleeve 215 surrounds the central portion of the rotor 190 and is rotatably supported in relation to the rotor by a pair of anti-friction bearings 216 spaced between the inner races of the bearings 191 by cylindrical spacers 217. Diametrically opposed brackets or plates 220 (FIGS. 11 and 15) are secured to the casing 215 and project radially through corresponding openings 221 formed within the peel housing 182. A box-like housing including parallel spaced end plates 223 and 224, side plates 226 and cover plate 227 (FIG. 10), is secured to each side of the peel housing 182 covering the corresponding opening 221.

A pair of compression springs 230 are spaced between the end plates 223 and 224 and the plate 220 and serve to bias axial movement of the rotor 190 relative to the peel housing 182. A hydraulic cylinder or shock absorber 232 is mounted on each of the forward end plates 224 and includes a piston rod 233 which extends through an opening 234 in the plate 224. The piston rod is connected by a pin 236 to a rib 237 secured to the plate 220 projecting from the sleeve 215. The pair of shock absorbers 232 cooperate to dampen axial oscillation of the rotor 190 relative to the peel housing 182.

Referring to FIGS. 11 and 13, parallel spaced plates 240 are rigidly mounted on the forward end portion of the rotor 190 and support parallel spaced tubes 241 in which are mounted shafts 242. A set of elongated jaw arms 245, which are essentially identical in construction except for rearwardly projecting ears 247 and 248, are pivotally mounted on the shafts 242 by bearings 249 (FIG. 13) retained within the ears 247 and 248. The corresponding ears on common sides of the arms are pivotally connected by links 251 (FIG. 13) and pins 252 so that the arms 245 pivot simultaneously on the axes of the shafts 242.

Referring to FIG. 14, the arms 245 are hollow and include opposing V-shaped wall portions 254. Jaw members 255 are mounted on each arm 245 and each jaw member includes axially projecting portions 256 (FIG. 12) in which are formed aligned semi-cylindrical surfaces 258 for pivotally supporting corresponding semi-cylindrical bosses 259 projecting from a V-shaped jaw 260. Each jaw 260 is retained by side plates 262 (FIGS. 11 and 12) mounted on the jaw members 255 by screws 263 one of which extends axially into the corresponding boss 259.

Referring to FIGS. 11 and 12, a pair of hydraulic cylinders 265 are pivotally mounted on one of the arms 245 by pin 266 extending through a bracket 267 mounted on the arm. Each cylinder includes a piston rod 268 (FIG. 14) pivotally connected by a pin 269 to a bracket 271 mounted on the other arm. Thus the cylinders 265 are mounted outboard of the arms 245 and in front of the pivot connection of the arms to the shafts 242.

Hydraulic fluid is supplied to each cylinder 265 by a flexible conduit (not shown) extending from a generally cylindrical gland member 273 (FIGS. 11 and 17) mounted on the forward end portion of the rotor 190 for rotation therewith. Circumferential grooves 274 are formed on the external surface of the gland member 273 and are connected by axially extending passageways 275 (FIG. 17) to threaded outlets 276 formed within the forward face of the gland member for connection to the supply conduits extending from the hydraulic cylinders 265.

An outer casing 277 (FIGS. 10, 11 and 17) is mounted on the gland member 273 by bearings 278 (FIG. 17) and includes a head portion 279 secured to the forward end plate 184 of the peel support housing by a bracket 280 (FIG. 11). Fluid supply ports 281 (FIG. 11) are formed within the head portion 279 in alignment with the circumferential grooves 274 formed within the gland member 273. Thus by controlling the supply of hydraulic fluid to and from the ports 281 by a solenoid controlled valve (not shown), actuation of the hydraulic cylinders 265 is controlled, which in turn controls movement of the arms 245 and opening and closing of the jaws 260.

An annular bellows 282 connects the outer casing 277 with the front end plate 184 of the peel support housing for preventing dirt or foreign particles from entering the bearings 191, and ring seals 283 prevent fluid from leaking from the grooves 274 during axial and rotary movement of the rotor 190 and gland member 273 relative to the housing 182 and casing 277.

Referring to FIG. 2, a transfer device 290 is positioned below one of the support rails 150 extending from the left side of the forging press, and another transfer device 290 is positioned under a rail 150 extending from the opposite side of the forging press. Referring to FIGS. 16, 18 and 19, each transfer device 290 includes a base member 292 which supports a pair of housings 294 each enclosing a hydraulic motor 295 having aligned output shafts 296 connected by collars 297 to one end portion of an arm 298. The opposite end portion of the arm 298 supports a housing 299 (FIG. 19) which encloses another pair of hydraulic motors 295 arranged in tandem.

The output shafts 296 of the motors carried by the arm 298 are rigidly connected by collars 297 to corresponding clamping arms 300. A pair of gears 302 are mounted on the outer sides of each clamping arm 300 and are arranged with the axes of the gears coinciding with the axes of the corresponding output shafts 296 of the motors 295. As shown in FIG. 16, the gears 302 on corresponding sides of the clamping arms 300 are in mesh so that the clamping arms 300 move in synchronism. A housing 304 covers each set of meshing gears 302.

An elongated jaw member 305 is pivotally mounted on the outer end portion of each clamping arm 300 by a part cylindrically shaped portion 306 (FIG. 19) received within a corresponding socket 308 formed within the end portion of each arm. Each jaw member is provided with a longitudinally extending V-shaped portion 310 and is retained within the corresponding arm 300 by an end cap 311.

Referring to FIG. 1, the motor drive pumps 172 and 209 for operating the hydraulic carriage drive motor 170 and rotor drive motor 200, respectively, the solenoid valve for actuating the hydraulic cylinder 265 and the linear actuator for controlling the vane pitch in the carriage hydraulic drive motor 170 are connected by a series of flexible cables 314 to a control console 315 supported by an elevated platform 316. The cables 314 are suspended from towers 318 which are positioned midway between the ends of the corresponding pair of rails 150 so that the corresponding carriage 155 can travel the entire length of the rails.

The control console 315 is also connected to control the operation of the press drive motors 48 and the solenoid valves for controlling the supply of fluid to the hydraulic head index motors 125, lock bar cylinders 138, cylinder chambers 64 and the hydraulic motor 295 for the transfer devices 290. While each hydraulic motor or cylinder can be operated manually from the control console, each motor and cylinder is also adapted to be automatically controlled in accordance with a predetermined sequence as programmed within a magnetic or punched tape control system 320.

Figure 20:
FIGS. 20–26 illustrate the successive forging operations performed on a billet by the apparatus shown in FIGS. 1–19 for forming the billet into a railroad car axle in accordance with the invention.

As mentioned above, the apparatus of the invention is ideally suited for forming railroad car axles from an elongated steel billet having a generally square cross-sectional configuration. Thus to illustrate the operation of the apparatus for producing axles, the successive steps of forming a billet into a railroad car axle are described with reference to FIGS. 20–26. Referring to FIG. 2, an elongated generally square billet B (FIG. 20) having been heated within a furnace, is picked up from the furnace conveyor by the jaw members 305 of the left transfer device 290 (FIG. 2), and the hydraulic motors 295 within the housings 294 are energized to move the arm 298 from a generally horizontal position shown by the dotted lines in FIG. 15, to a generally vertical position where the axis of the billet is aligned with the rotor axis of the left peel 180 (FIG. 2).

The drive motor 170 for the left peel carriage 155 is actuated to advance the peel 180 toward the aligned billet B until the left end portion of the billet is received within the jaws 260 (FIG 2). The jaws are then closed by actuating the hydraulic cylinders 265 so that the billet is gripped on one end, after which the jaw members 305 are released and the arm 298 returned to a horizontal position ready for receiving the next billet from the furnace.

As the first operation on the billet B, the corners are rounded by passing the billet back and forth between the first set of die members 130. To accomplish this, the left peel 180 is moved towards the forging press by actuation of the drive motor 170 to move the billet axially at a predetermined speed without rotation between the first set of die members mounted on the corresponding turret heads 120.

Figure 21:
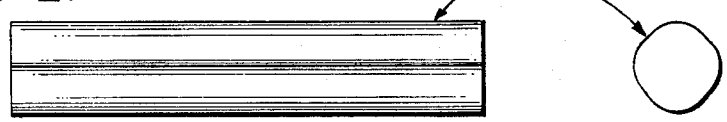

To assure that the billet is engaged by the die members along the entire length of the billet, after the billet has passed part way through the forging press, the right peel (FIG. 2) grips the right end portion of the billet after which the left peel releases the billet and the right peel continues to pull the billet entirely through the press. The rotors on both peels are then rotated 90° by actuation of the motors 200, and the billet is moved back through the press and transferred from the right peel to the left peel with the result that all four corners on the billet are rounded thereby producing an increase in the length of the billet as shown in FIG. 21.

Figure 22:
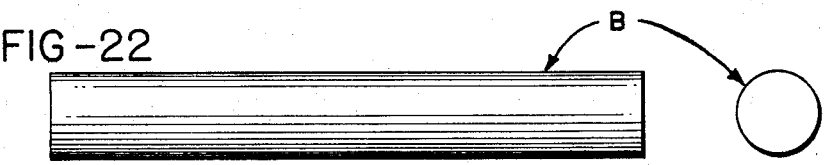

After the billet has been passed through the press for rounding the corners, the same two dies 130 are moved closer together by supplying a predetermined quantity of hydraulic fluid to the corresponding cylinder chambers 64 on the back side of the pistons 65. The billet is then rotated at a constant speed by the motor 190 while the billet is passed between the reciprocating die set and is again transferred from the left peel to the right peel for converting the entire billet into a substantially cylindrical configuration as shown in FIG. 22. The length of the billet increases again as it is formed into the cylindrical configuration and accordingly, compensation is made in the spacing between the peels by adjusting the relative positions of the peel supporting carriages.

Figure 23:
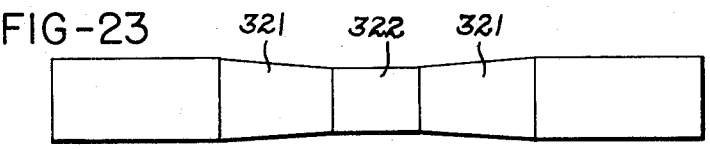

After the billet is formed into a cylindrical configuration, the next operation is to reduce the diameter of the central portion of the billet to form a configuration as shown in FIG. 23. This is accomplished by passing the rotating billet between the first set of die members 130 while the spacing between the die members is progressively changed by controlling the fluid within the chambers 64 as the billet is moved axially between the die members. By correlating the axial movement of the billet with the adjustment in the minimum spacing between the die members, a pair of uniformly tapering portions 321 (FIG. 23) are formed on the billet along with a cylindrical portion 322 of reduced diameter.

Figure 24:
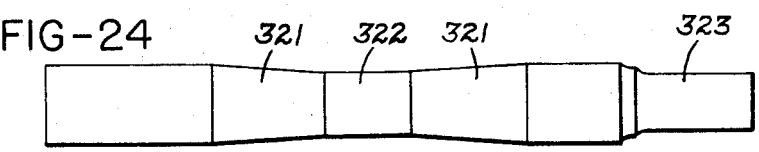
Figure 25:
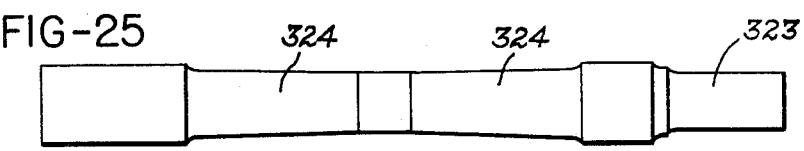

The next operation is to form a journal portion 323 on the billet as shown in FIG. 24. This is performed by indexing each turret head 90° by actuation of the hydraulic motors 125 to present a first set of journal forming dies. This set of dies is repeatedly impacted against the end portion of the billet while the billet is rotated and moved axially to some extent by the left peel and the minimum spacing between the die members is progressively reduced.

As the next operation, the central portion of the billet is formed with tapering portions 324 (FIG. 25) in accordance with a final configuration. For this, the turret heads 120 are each indexed another 90° to present a set of corresponding center tapering die members 130. This set of die members is repeatedly impacted against the billet while the billet is rotated and moved axially by the left peel and the minimum spacing between the die members is progressively adjusted.

Figure 26:
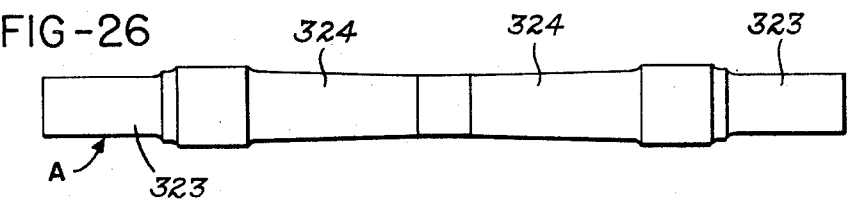

The final step in producing a forged axle A is the forming of a journal portion 323 on the opposite end of the billet (FIG. 26). To accomplish this, the billet is transferred to the right peel 180 and the turret heads 120 are indexed to present a second set of journal forming die members 130 which are repeatedly impacted against the billet while the billet is rotated and moved axially by the right peel and the corresponding die members 130 are progressively spaced closer together at the forward end of the ram stroke.

As can be seen from the drawings and the above description, forging apparatus constructed in accordance with the invention provides many desirable features and advantages. For example, by providing precise control of the minimum spacing between a set of die members 130 and a selection of different sets of die members 130 along with controlled and coordinated rotational and axial movement of the billet by the peels 180, the apparatus of the invention can form a generally square billet into the precise configuration of a railroad car axle within a minimum period of time. Furthermore, it has been determined that the contour or configuration of the axle A can be precisely formed with the apparatus of the invention that it is necessary to remove only a fraction of an inch from the surface of the forged axle by a subsequent machining operation to finish the axle to final dimensions.

The novel construction of the press sections 30 enables a billet to be formed to a precise cross-sectional configuration without requiring the press sections to be stopped for a substantial time for interchanging die members. That is, the positioning of the piston 65 within the cylinder chamber 64 of each press section can be performed without interrupting the reciprocating movement of the ram housing, which may be in the order of 250 strokes per minute, and the indexing of each turret head 120 can be performed rapidly with no significant delay in the movement of the ram housings.

Another important feature provided by the forging press is the pressure relief system provided by the passageways 80 formed within the piston 65 and the closure member 85 normally biased against the nozzle members 82 mounted within the passageways. Thus if one of the turret heads 120 failed to index properly or the billet is not properly centered or aligned between the opposing die members 130 so that the turret heads were blocked from moving to a fully extended position, the closure member will immediately open when the hydraulic pressure behind the piston increases to a predetermined maximum limit and thereby allow the ram housing 55 to continue moving forwardly relative to the piston 65 while the forward ram housing 100 stops.

The pressure at which the closure member opens is determined by the force exerted by the compression springs 88. As an example, the springs may be selected so that the closure member 85 opens when the pressure within the cylinder 64 exceeds 3400 p.s.i. Furthermore, by employing the rearwardly extending piston rod 66 so that the annular cylinder chambers on opposite sides of the piston are of equal size, hydraulic fluid can be released through the passageways 80 without displacing any fluid externally to an accumulator.

Another feature of the forging press is provided by cooperation of the locking bars 134 and 135 with the die members 130 mounted on each turret head 120. That is, when the locking bars are advanced by the hydraulic cylinders 138 as shown in FIG. 8, the die member 130 diametrically opposite to the die member in use is clamped or wedged between the lock bars to prevent movement of the turret head and misalignment of the corresponding die members positioned for engaging the billet.

Additional features are provided by each of the peels 180. For example, the hollow construction of the tubular rotor 190 of each peel and the outboard location of the cylinders 265 enable each peel to handle a billet of substantial length. Thus the peels could be used for supporting billets for forging long shafts or rolls. Another feature is provided by the overall radial compactness and low mass of the tubular rotor 190 of each peel. This structure has been found highly desirable for minimizing the moment of inertia of the rotor and thereby enables rotation of the rotor to be quickly stopped and started as the die members 130 repeatedly engage the billet.

The location and mounting of the hydraulic cylinders 265 for actuating the arms 245 contribute to the low moment of inertia of the rotor. That is, by positioning the pair of cylinders 265 in front of the pivot connection of the arms on the shafts 242, the capacity and size of the cylinders can be minimized due to the substantial moment arm and gripping force provided by the forward location of the cylinders.

The accumulator 210 located in the supply line for the hydraulic motor 200 for driving the rotor 190 provides the feature of permitting interruption of the rotation of the rotor and drive motor 200 without requiring the supply pump and its electric drive motor to be interrupted each time rotation of the rotor is momentarily stopped by impact of the die members 130 against the billet. The hydraulic accumulator also provides substantial energy for quick acceleration of the rotor 190 after each impact to advance the billet and thereby enable the ram housings 55 to reciprocate at a high speed. Furthermore, the combined hydraulic drive motor 200 and accumulator 210 in conjunction with the low mass and moment of inertia of the rotor 190 prevent torsional overstressing of the rotor and twisting of the end portion of the billet within the gripping jaws 260 and thereby substantially extend the life of the die members.

Another important feature of each peel 180 is provided by enabling the rotor 190 to move axially relative to its support housing 182 and its corresponding carriage 155. Thus when a billet is moved axially between the die members 130 by operation of a carriage drive motor 170, and the axial movement is repeatedly interrupted due to the impacting engagement of the billet by the die members, the carriage 155 and rotor housing 180 can continue to travel while the springs 230 mounted outboard of the rotor housing absorb the energy. As soon as the die members separate, however, the compressed springs quickly advance the rotor and billet axially while the hydraulic cylinders 232 dampen the axial movement and prevent oscillation of the rotor and billet.

Referring to FIGS. 1 and 2, it can be seen that the overall arrangement of the forging apparatus of the invention provides desirable advantages. For example, by positioning a pair of peels in opposing aligned relationship an opposite sides of the forging press and by providing corresponding transfer devices 290, a successive flow of billets can be received, formed into axles and discharged with a minimum time period for forging each axle.

Thus while the left journal portion is being formed on a billet supported by the right peel, the left peel may be fully retracted for receiving the next square billet B from the corresponding transfer device 290. Furthermore, the fluid supply to each of the hydraulic drive motors 125, 200 and 295 and for each of the hydraulic cylinders 64, 138 and 265 is independently controlled by a corresponding solenoid valve so that the operation of each component and the linear actuator for controlling the pitch of the vanes in the carriage drive motors 170 can be remotely controlled by a programmed control system to provide for completely automatic forging of a successive flow of billets into axles.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for forging a billet into a predetermined configuration, comprising at least two rams, means supporting each said ram for movement generally towards and away from a centerline, drive means for reciprocating each said ram, a head member connected to each said ram and a plurality of die members on each said head member, each said die member having a predetermined configuration and corresponding said die members forming a die set, means for supporting the billet on said centerline, and means for moving each said head member relative to its corresponding said ram for selectively positioning said die sets to engage the billet for forming the billet in successive steps to said predetermined configuration.

2. Apparatus as defined in claim 1 wherein said die members are arranged in angularly disposed relationship on each said head member, and comprising means connected to each said ram for rotatably supporting the corresponding said head member, and said moving means including means for rotatably indexing each said head member for selectively positioning corresponding said die members for engaging the billet.

3. Apparatus for forging a billet into a predetermined configuration, comprising a ram, means supporting said ram for movement generally towards and away from a centerline, drive means for reciprocating said ram, a head member, a plurality of die members angularly disposed on said head member and each said die member having a predetermined configuration, means connected to said ram for rotatably supporting said head member, means for supporting the billet on said centerline, and means carried by said ram for selectively indexing said head member relative to said ram for selectively positioning said die members to engage the billet for forming the billet in successive steps to said predetermined configuration.

4. Apparatus as defined in claim 3 wherein said head member includes a plurality of angularly disposed faces each extending parallel to the axis of rotation of said head member and means for removably mounting one of said die members on each face of said head member, and wherein said means for indexing said head member include at least one fluid motor.

5. Apparatus as defined in claim 3 including means carried by said ram for positively locking said head member for preventing movement of said head member as each said die member engages the billet.

6. Apparatus as defined in claim 5 wherein said locking means includes a set of first and second parallel spaced bars, said first bar having a wedge surface thereon, means slidably supporting said bars, fluid cylinder means connected to said bars for moving said bars from a retracted position to an advanced position with a die member wedged therebetween, and means for maintaining at least said first bar in parallel relationship with the axis of rotation of said head member during movement of said first bar.

7. Apparatus for forging a billet into a predetermined configuration, comprising a ram, means supporting said ram for movement on an axis, eccentric drive means for reciprocating said ram, a die member, means supporting said die member for movement on said axis, means connecting said die member supporting means to said ram and including means defining a hydraulic cylinder having a piston slidably mounted therein, and means for supplying a selectable volume of hydraulic fluid to said cylinder during movement of said ram for selectively adjusting the relative spacing between said die member and said ram for successively forming the billet to said predetermined configuration.

8. Apparatus as defined in claim 7 wherein said means defining said cylinder is formed integrally with said ram.

9. Apparatus as defined in claim 7 wherein said die member supporting means include a forward ram housing supporting a head member, a plurality of said die members mounted on said head member, and means for moving said head member relative to said forward ram housing for selectively positioning each said die member for engaging the billet to form the billet quickly to a precise predetermined configuration.

10. Apparatus as defined in claim 7 including piston rod means extending from each side of said piston and cooperating with said cylinder to define annular chambers of equal size on opposite sides of said piston, means defining at least one passageway connecting said chambers, and relief valve means for releasing hydraulic fluid through said passageway when the hydraulic pressure within a chamber on one side of said piston exceeds a predetermined maximum limit for preventing accidental overstressing of said press or damage to said die member.

11. Apparatus as defined in claim 10 including means defining a plurality of said passageways within said piston, and wherein said relief valve means includes spring biased closure means carried by said piston and normally closing each said passageway and adapted to release a substantial flow of hydraulic fluid instantaneously through said passageways to provide for immediate relative movement between said die member and said ram while eliminating the need for a reservoir and plumbing external of said cylinder.

12. Apparatus for supporting a billet during forging of the billet into a predetermined configuration, comprising a peel including a housing, a tubular rotor rotatably supported in said housing and being open at each end to receive a billet therethrough, movable jaw means mounted on said rotor for gripping the billet with the axis of the billet aligned with the axis of said rotor, a carriage supporting said peel and adapted to be supported by a track, drive means for moving said carriage on the track for moving said rotor and the billet in an axial direction, drive means movable with said carriage and connected to rotate said rotor, and means providing for momentary stalling of said rotor during the instant the billet is engaged during forging and rotation of the billet is prevented.

13. Apparatus as defined in claim 12 wherein said drive means for rotating said rotor includes a hydraulic motor and a supply pump, and said means providing for stalling of said rotor includes an accumulator connected to store momentarily the fluid output of said pump during the instant rotation of the billet is stopped during forging and to supply energy for quickly accelerating the rotation of said rotor and the billet when the billet is released.

14. Apparatus as defined in claim 12 including bearing means providing for axial movement of said rotor relative to said housing, and biasing means connected between said rotor and said housing to avoid repetitive stopping and starting of said carriage when axial movement of said rotor is stopped during forging of the billet.

15. Apparatus as defined in claim 14 including a sleeve surrounding said rotor, bearing means mounted on said rotor and supporting said sleeve for rotation relative to said rotor, said bearing means providing axial movement of said sleeve with said rotor, bracket means extending radially outwardly from said sleeve, said biasing means including a plurality of springs mounted on said housing and engaging opposite sides of said bracket means, and damping means connecting said bracket means to said housing to avoid axial oscillation of said rotor.

16. Apparatus as defined in claim 12 including at least two spaced apart anti-friction bearings mounted on said housing and supporting said rotor, and each said bearing including a cylindrical cage retaining a plurality of axially and circumferentially disposed balls for providing both axial movement and rotation of said rotor relative to said housing.

17. Apparatus as defined in claim 12 wherein said jaw means include at least two axially extending arms pivotally mounted on one end portion of said rotor, linkage means connecting said arms to provide simultaneous movement of said arms for aligning the axis of the billet with the axis of the rotor, fluid cylinder means connecting said arms and positioned outboard of said arms to avoid interference with the billet, and rotary gland means for supplying fluid to said cylinder means to actuate said arms for gripping and releasing the billet and cooperating to provide said rotor and said arms with a minimum moment of inertia to enable rapid starting and stopping of the rotation of the rotor and billet.

18. Apparatus as defined in claim 17 including a jaw member pivotally mounted on the forward end portion of each said arm for providing uniform gripping of the billet by said jaw members.

19. Apparatus for forging an elongated billet into a predetermined configuration and adapted to be operated by automatic control, comprising a press including at least two rams arranged in generally opposed relationship, means supporting each said ram for linear movement, eccentric drive means on said press for reciprocating said rams simultaneously towards and away from each other, a die member connected to each said ram and disposed so that said die members are arranged in generally opposed relationship, a pair of peels arranged in opposed aligned relationship with said press therebetween and having a common axis extending normally to the direction of linear movement of said rams, a rotor on each said peel, movable jaw means mounted on each said rotor, means for actuating said jaw means on each said rotor for gripping the billet, a carriage supporting each said peel, track means supporting each said carriage, drive means for independently moving each said carriage on said track means for moving said peel and the billet in an axial direction, and drive means for independently rotating each said rotor.

20. Apparatus as defined in claim 19 including transfer means on one side of said press for receiving a billet and transferring it to a position in axial alignment with said rotor of the corresponding said peel for loading said peel, and transfer means on the opposite side of said press for receiving a forged billet from the corresponding said peel and transferring the forged billet to a discharge station to provide for efficiently forging a continuous supply of billets.

21. Apparatus as defined in claim 20 wherein each said transfer means include a base pivotally supporting an arm, a pair of movable clamping jaws supported by said arm, means interconnecting said jaws for providing simultaneous movement of said jaws to assure alignment of the axis of the billet with the axis of said rotor of the corresponding said peel, and hydraulic motor means for moving said arm and actuating said clamping jaws.

22. Apparatus as defined in claim 19 including a pair of clamping arms each having a jaw member, means supporting said arms for pivotal movement on corresponding parallel axes with said jaw means disposed in generally opposed relationship, hydraulic motor means connected for pivoting said clamping arms to move said jaw means for alternately gripping and releasing a billet, and means interconnecting said clamping arms for providing simultaneous movement of said arms for accurately locating the axis of the billet.

23. Apparatus as defined in claim 22 including a base member pivotally supporting one end portion of an arm member, hydraulic motor means for pivoting said arm member on said base member, a pair of hydraulic motors mounted on the other end portion of said arm member, each said hydraulic motor including output shaft means supporting one of said clamping arms, and gear means mounted on said output shaft means and meshing to provide simultaneous movement of said clamping arms.

24. Apparatus for forging a billet into a predetermined configuration, comprising a ram, means supporting said ram for movement on an axis, eccentric drive means for reciprocating said ram, a die member, means supporting said die member for movement on said axis, means connecting said die member supporting means to said ram and including means defining a hydraulic cylinder having a piston slidably mounted therein, means defining a plurality of generally axially extending passageways within said piston, relief valve means mounted on said piston normally closing said passageways, and means for supplying a selectable volume of hydraulic fluid to said cylinder for selectively adjusting the relative spacing between said die member and said ram.

References Cited

UNITED STATES PATENTS

| | | | |
|---|---|---|---|
| 1,690,419 | 11/1928 | McCain | 10—11 |
| 1,841,920 | 1/1932 | Smith | 72—407 |
| 2,164,640 | 7/1939 | Cannon | 72—432 |
| 2,347,875 | 5/1944 | Bratz | 72—421 |
| 3,078,906 | 2/1963 | Fuchs | 72—421 |
| 3,143,007 | 8/1964 | Thompson | 72—431 |
| 3,209,578 | 10/1965 | Muller | 72—453 |
| 3,271,989 | 9/1966 | Paddock | 72—432 |
| 3,274,819 | 9/1966 | Knowles | 72—453 |
| 3,336,787 | 8/1967 | Hutson | 72—453 |

CHARLES W. LANHAM, Primary Examiner

G. P. CROSBY, Assistant Examiner

U.S. Cl. X.R.

72—413, 421, 442, 447; 214—1